US007243161B1

(12) United States Patent
Tappan et al.

(10) Patent No.: US 7,243,161 B1
(45) Date of Patent: *Jul. 10, 2007

(54) TWO LABEL STACK FOR TRANSPORT OF NETWORK LAYER PROTOCOLS OVER LABEL SWITCHED NETWORKS

(75) Inventors: Daniel C. Tappan, Boxborough, MA (US); Eric C. Rosen, Arlington, MA (US); Parag Jain, Nepean (CA); Eric Levy-Abegnoli, Nice (FR); Luc Revardel, La Gaude (FR); Francois Le Faucheur, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 645 days.

This patent is subject to a terminal disclaimer.

(21) Appl. No.: 10/013,817

(22) Filed: Dec. 7, 2001

(51) Int. Cl.
*G06F 15/16* (2006.01)
(52) U.S. Cl. .................. 709/245; 709/238; 370/389
(58) Field of Classification Search ........... 709/238, 709/245, 246; 370/392, 352, 230
See application file for complete search history.

(56) References Cited

U.S. PATENT DOCUMENTS

| 5,020,052 | A | 5/1991 | DePrycker et al. .......... 370/60 |
| 6,690,669 | B1* | 2/2004 | Tsuchiya et al. ............ 370/392 |
| 6,708,219 | B1* | 3/2004 | Borella et al. .............. 709/245 |
| 6,735,199 | B1* | 5/2004 | Ofek ........................ 370/389 |
| 6,741,585 | B1* | 5/2004 | Munoz et al. .............. 370/352 |
| 6,804,776 | B1* | 10/2004 | Lothberg et al. ........... 713/160 |
| 2001/0040895 | A1* | 11/2001 | Templin .................... 370/466 |
| 2002/0073215 | A1* | 6/2002 | Huitema et al. ........... 709/230 |

OTHER PUBLICATIONS

Postel, "Internet Protocol," Request for Comments 791, Internet Engineering Task Force, Sep. 1981.
Rekhter, et al., "A Border Gateway Protocol 4 (BGP-4)," Request for Comments 1771, Internet Engineering Task Force, Mar. 1995.
Bates, et al., "Multi-Protocol Extensions for BGP-4," Request for Comments 2858, Internet Engineering Task Force, Jun. 2000.
Marques, et al., "Use of BGP-4 Multi Protocol Extensions for IPv6 Inter-Domain Routing," Request for Comments 2545, Internet Engineering Task Force, Mar. 1999.
Deering, et al., "Internet Protocol, Version 6 (IPv6)," Request for Comments 2460, Internet Engineering Task Force, Dec. 1998.

(Continued)

*Primary Examiner*—David Wiley
*Assistant Examiner*—Kyung-Hye Shin
(74) *Attorney, Agent, or Firm*—Cindy Kaplan

(57) ABSTRACT

IPv6 traffic may be carried through an MPLS IPv4 network without the use of IPv6-over-IPv4 tunneling. An IPv6 packet is sent through the MPLS IPv4 network through a label switched path (LSP). The IPv6 packet is encapsulated with a label stack associated with the LSP. A second level label is used in the label stack (in addition to the label associated with the LSP). This second level label provides important benefits.

38 Claims, 4 Drawing Sheets

OTHER PUBLICATIONS

Rosen, et al., "Multi-Protocol Label Switching Architecture," Request for Comments 3031, Internet Engineering Task Force, Jan. 2001.

Rosen, et al., "BGP/MPLS VPNs," Request for Comments 2547, Internet Engineering Task Force, Mar. 1999.

Nguyen et al. "BGP-MPLS VPN extension for IPv6 over an IPv4 infrastructure," Internet Draft, Nov. 2001. http://search.ieft.org/internet-draft/draft-ieft-ppvpn-bgp-ipv6-vpn-01.txt.

M. Miller, P.E. "Implementing IPv6, Second Edition: Supporting the Next Generation Protocols," Chapter 9, pp. 285-310, 2000.

* cited by examiner

TWO LABEL STACK FOR TRANSPORT OF NETWORK LAYER PROTOCOLS OVER LABEL SWITCHED NETWORKS

STATEMENT OF RELATED APPLICATIONS

The present invention is related to the subject matter of co-filed and co-assigned U.S. patent application Ser. No. 10/013,818, entitled "IPv6 over MPLS IPv4 Cores", the contents of which are herein incorporated by reference in their entirety for all purposes.

BACKGROUND OF THE INVENTION

The present invention relates to data communication networks and more particularly to systems and methods for facilitating interoperation between currently deployed Internet infrastructure and newer Internet infrastructure employing next generation protocols.

To accommodate the explosive growth of the Internet, a very large number of network nodes have been configured to employ IP (Internet Protocol). These nodes range from user workstations to very high throughput core routers. There have been successive versions of IP but as of the filing date of the present application, the predominant variant of IP deployed in the field is IPv4.

In recent years, many service providers have deployed IPv4 core networks that employ a forwarding mechanism referred to as MPLS (Multiprotocol Label Switching). Such networks are referred to herein as MPLS IPv4 networks. MPLS employs labels, rather than the contents of the IP packet to make forwarding decisions at each intermediate node. At each hop, an output interface and a substitute label are selected based on the received packet label. This provides advantageous flexibility in the deployment of new beneficial routing schemes. For example, the use of MPLS facilitates traffic engineering to shift traffic from congested paths to paths with excess capacity, fast re-routing around failed links or nodes, and large-scale virtual private network (VPN) deployment.

The Internet engineering community is planning and implementing a shift from IPv4 to IPv6. Advantages of IPv6 include an enormous expansion in the available address space to accommodate both greater ubiquity of Internet-enabled devices as well as less reliance on cumbersome network address translation schemes which have been utilize to conserve addresses. IPv6 also provides highly useful auto-configuration capabilities.

Service providers wish to offer IPv6 connectivity through their core networks while minimizing expense and configuration difficulties. Immediately replacing the core network infrastructure with MPLS IPv6 equipment is economically unviable for many service providers. Upgrading MPLS IPv4 routers to support both IPv4 and IPv6 raises challenges in the areas of hardware incompatibility with IPv6 forwarding requirements, network management, stability, and commercial availability of appropriate software.

Thus, a need arises to forward IPv6 traffic over the MPLS IPv4 core so that service providers can offer IPv6 services without any upgrading or reconfiguration of their core network. One proposed solution is to employ some type of tunneling mechanism (e.g., IPv6-over-IPv4) where each IPv6 packet is encapsulated into an IPv4 packet which in turn is encapsulated into MPLS. Using this type of encapsulation over MPLS, however, brings several drawbacks. There is extra overhead resulting from the added header information. Furthermore, establishing numerous static tunnels requires additional configuration and storage of state information while use of dynamic tunnels requires support of specific software mechanisms, activation/configuration of these software mechanisms and furthermore involves constraints on IPv6 addresses to be allocated.

Another proposed solution has been developed for forwarding IPv6 packets across an MPLS IPv4 network without employing IPv6-over-IPv4 tunnels whereby IPv6 packets are directly encapsulated in MPLS IPV4 LSPs. This approach is not admitted prior art and is described in the co-filed application entitled "IPv6 Over MPLS IPv4 Core". Realization of this approach requires addressing certain operational characteristics of MPLS networks.

SUMMARY OF THE INVENTION

IPv6 traffic may be carried through an MPLS IPv4 network without the use of IPv6-over-IPv4 tunneling. An IPv6 packet is sent through the MPLS IPv4 network through a label switched path (LSP). The IPv6 packet is encapsulated with a label stack associated with the LSP. By virtue of one embodiment of the present invention, a second level label is used in the label stack (in addition to the label stack associated with the LSP). This second level label provides important benefits.

For example, the penultimate LSP node and the receiving interface of the MPLS IPv4 network egress node may not be configured to process IPv6 packets even when optional penultimate hop popping is used (i.e. the optional popping of the top label in the label stack by the penultimate). Also, the egress node may use the second level label to determine that the encapsulated packet is an IPv6 packet in order to make the appropriate forwarding decision. Another example of a potential benefit of the second level label is that it may be used by the egress node to perform its forwarding lookup. In that case, the egress node performs an MPLS label look-up rather than an IPv6 destination address lookup.

A first aspect of the present invention provides a method for operating a network node to forward a packet employing a first addressing scheme through a label switched network employing a second addressing scheme. The method includes: receiving the first addressing scheme packet, extracting destination address information according to the first addressing scheme from the first addressing scheme packet, based on the destination address information, selecting a label stack including a second level label distributed by an egress node of the label switched network, and forwarding the first addressing scheme packet along with the label stack into a label switched path through the label switched network terminated by the egress node, without encapsulation within a packet incorporating address information specified by the second addressing scheme.

A second aspect of the present invention provides a method for operating an egress node of a label switched network employing a first network layer protocol to interface with a network employing a second network layer protocol. The method includes: receiving a packet from the label switched network, examining the packet to detect a second level label advertised by the egress node, and processing the packet in accordance with at least one of the second level label and the second network layer protocol.

Further understanding of the nature and advantages of the inventions herein may be realized by reference to the remaining portions of the specification and the attached drawings.

DESCRIPTION OF SPECIFIC EMBODIMENTS

The present invention will be described with reference to a representative application where IPv6 traffic is to be forwarded across an MPLS IPv4 network. It will be appreciated, however, that similar functionality may be employed in other situations where different network protocols are desired to interoperate. For example, the invention is also applicable to the transport of IPv4 traffic over an MPLS IPv6 network. Also, other label switching schemes may be used instead of MPLS.

Figure 1:
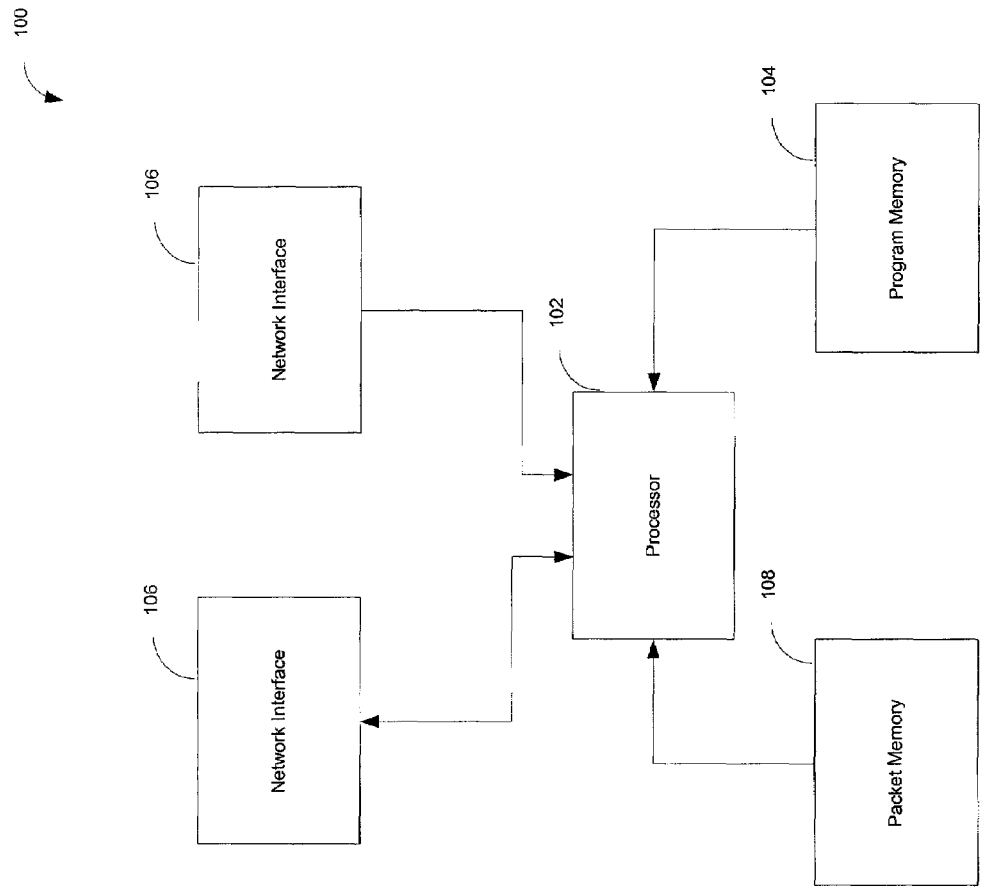
FIG. 1 depicts a network device suitable for implementing one embodiment of the present invention.

FIG. 1 depicts a network device 100 that may be used to implement a network node operating in accordance with the present invention. In one embodiment, network device 100 is a programmable machine that may be implemented in hardware, software or any combination thereof. A processor 102 executes code stored in a program memory 104. Program memory 104 is one example of a computer-readable storage medium. Program memory 104 can be a volatile memory such as a random access memory (RAM). Another form of computer-readable storage medium storing the same codes would be some type of non-volatile storage such as floppy disks, CD-ROMs, DVD-ROMs, hard disks, flash memory, etc. A carrier wave that carries the code across a network is another example of a computer-readable storage medium.

Network device 100 interfaces with physical media via a plurality (two are depicted) of network interfaces 106. For example, one of network interfaces 106 may couple to an optical fiber and may incorporate an appropriate physical and link layer functionality. Other examples of network interfaces include Ethernet interfaces, DSL interfaces, Gigabit Ethernet interfaces, 10-Gigabit Ethernet interfaces etc. Packets that are received, processed, and forwarded by network device 100 may be temporarily stored in a packet memory 108. Depending on its role, network device 100 implements various network protocols, extensions thereof, and data networking features provided by the present invention as will be explained below.

The description that follows refers to various protocols in use on the Internet as specified by the following documents, all of which are incorporated by reference herein in their entirety for all purposes:

Postel, "Internet Protocol," Request for Comments 791, Internet Engineering Task Force, September 1981.

Rekhter, et al., "A Border Gateway Protocol 4 (BGP-4)," Request for Comments 1771, Internet Engineering Task Force, March 1995.

Bates, et al., "Multi-Protocol Extensions for BGP-4," Request for Comments 2858, Internet Engineering Task Force, June 2000.

Marques, et al., "Use of BGP-4 Multi-Protocol Extensions for IPv6 Inter-Domain Routing," Request for Comments 2545, Internet Engineering Task Force, March 1999.

Deering, et al., "Internet Protocol, Version 6 (IPv6)," Request for Comments 2460, Internet Engineering Task Force, December 1998.

Rosen, et al., "Multi-Protocol Label Switching Architecture," Request for Comments 3031, Internet Engineering Task Force, January 2001.

Figure 2:
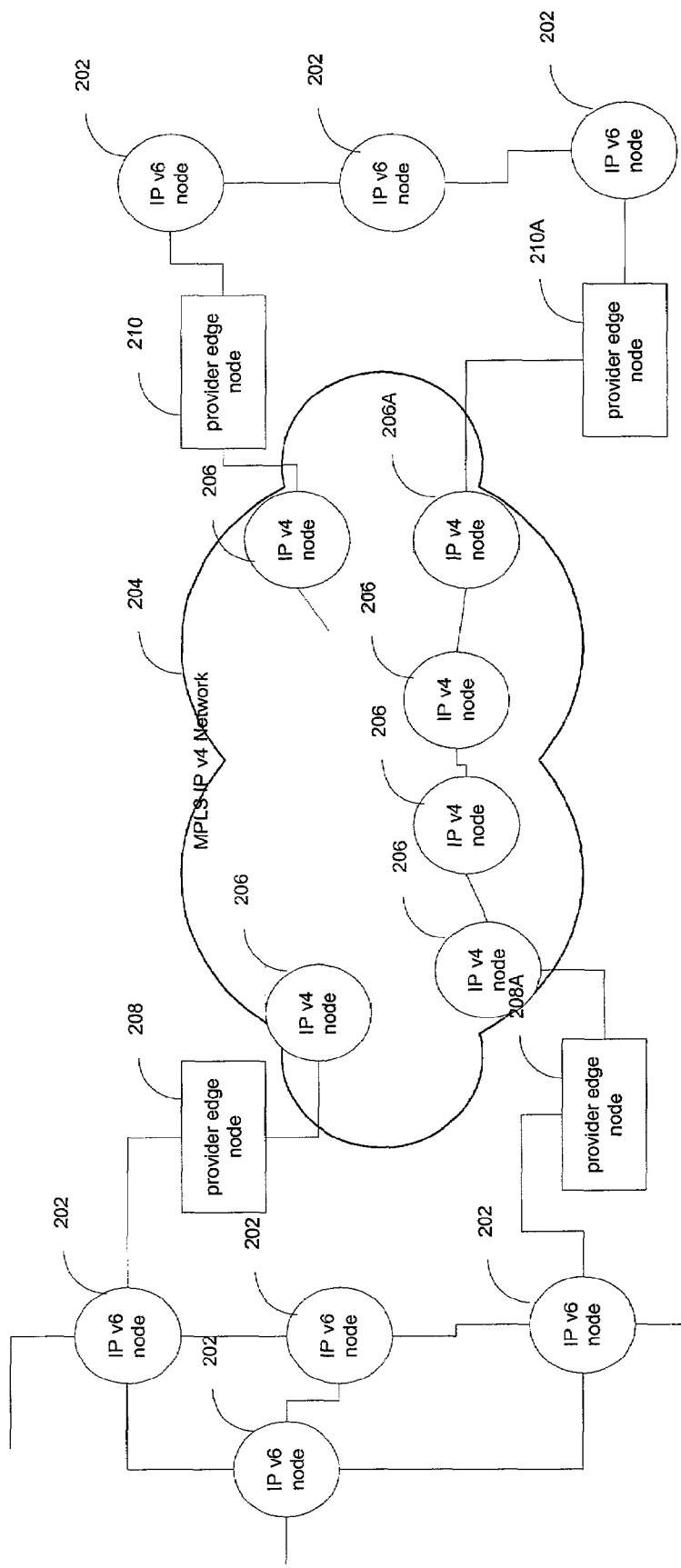
FIG. 2 depicts a mixed IPv4 and IPv6 network according to one embodiment of the present invention.

FIG. 2 depicts a networking environment suitable for implementing one embodiment of the present invention. There are three types of network nodes depicted in FIG. 2. IPv6 nodes 202 implement IPv6 network layer functionality. There is also an MPLS IPv4 network 204 to implement the core. Network 204 includes IPv4 nodes 206. Certain interior nodes of network 204 are omitted from FIG. 2 for clarity of depiction.

Each of IPv4 nodes 206 make forwarding decisions based on labels of received packets. The labels are used as keys to an MPLS label forwarding table that provides a substitute label and a selection of output interface. The contents of the label forwarding table at each node are established by a distributed process of translating IP routing control information into labels and then propagating these labels to the nodes where they are needed via one, or several, label distribution protocol(s). These label distribution protocols specify associations between destination addresses and destination networks (generically referred to as forwarding equivalence classes or FECs) and labels. In MPLS IPv4 networks, the label distribution protocols specify the FECs using the addressing scheme of IPv4. The distribution of labels within network 204 is also based on IPv4 addresses.

Provider edge nodes 208 and 210 represent a third class of node. The provider edge nodes 208 and 210 have IPv6 addresses and can fully interoperate with IPv6 nodes 202 in accordance with the IPv6 protocol. They also have IPv4 addresses used for communicating with IPv4 nodes 206. To facilitate operations in accordance with the invention, the IPv4 addresses of provider edge nodes 208 and 210 may be embedded in IPv6 addresses when advertised by an operative interdomain routing protocol such as MP-BGP.

Provider edge nodes 208 and 210 also incorporate IPv4 network layer functionality. Provider edge nodes 208 and 210 are specially configured to forward IPv6 packets across MPLS IPv4 network 204 without resorting to IPv6-over-IPv4 tunneling.

For convenience of description the provider edge nodes are referred to as ingress nodes 208 and egress nodes 210. For a given IPv6 packet flow, an ingress node acts as an entry point into the MPLS IPv4 network 204 while an egress node acts as an exit point from the MPLS IPv4 network. Although in FIG. 2, each edge node is depicted as either an ingress node or an egress node, every edge node will be able to operate as either an ingress node or an egress node depending on the direction of packet flow.

FIG. 2 also illustrates nodes supporting an LSP that may be employed by a particular IPv6 packet in traversing MPLS IPv4 network 204. This LSP begins at a particular ingress node 208A, extends through a number of IPv4 nodes 206 and ends at a particular egress node 210A. A penultimate node 206A in the LSP is specially denoted.

Figure 3:
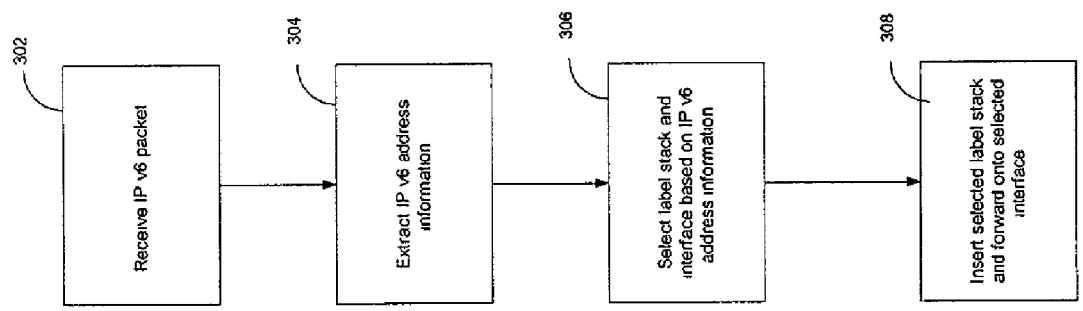
FIG. 3 is a flow chart describing steps of forwarding an IPv6 packet into an MPLS IPv4 network according to one embodiment of the present invention.

FIG. 3 is a flow chart describing steps for forwarding an IPv6 packet across the illustrated LSP according to one embodiment of the present invention. At step 302, ingress edge node 208A receives the IPv6 packet. At step 304, ingress edge node 208A extracts the destination IPv6 address from the received IPv6 packet.

At step 306, ingress node 208A references a special IPv6 forwarding table to retrieve information useful in forwarding the IPv6 packet. The IPv6 forwarding table is keyed by IPv6 destination address. Using the well-known longest match technique, ingress node 208A identifies an entry corresponding to the destination network (identified by prefix) of the IPv6 packet. The entry includes a label stack. The first level label of the label stack specifies the LSP. According to one embodiment of the present invention, the label stack also includes another label below the topmost label (i.e. below the first level label) which will be referred to herein as a "second level label". The second level label is not used for making forwarding decisions within MPLS IPv4 network 204 but is rather included to facilitate handling of the IPv6 packet at penultimate node 206A and/or egress node 210A of the LSP as will be explained below. At step 308, ingress node 208 forwards the IPv6 packet onto the selected LSP by encapsulating the packet with the retrieved label stack.

As the MPLS-encapsulated IPv6 packet encounters successive nodes 206 in the LSP, the topmost label in the stack is examined and used to select an output interface and a replacement label in accordance with standard well-known MPLS packet handling techniques. Since these nodes rely entirely on the label stack in forwarding the IPv6 packet, the lack of native IPv6 packet handling capabilities is not relevant.

The situation is, however, somewhat different with respect to penultimate node 206A. In many MPLS implementations, the penultimate node of an LSP is permitted to remove or "pop" the topmost label of the label stack (i.e. the LSP label in the situation illustrated in FIG. 2) prior to sending the packet to the MPLS network egress node, an operation referred to as penultimate hop popping (PHP). In an MPLS IPv4 network after popping, when the popped label was the only label in the label stack, the packet would be handled according to conventional IPv4 techniques. For example, the penultimate node might attempt to alter the contents of the time-to-live (TTL) counter field found within the IPv4 packet header. Furthermore, the penultimate node would modify the protocol ID field of the underlying link layer encapsulation header to identify the packet as "IPv4" rather than MPLS These otherwise benign consequences of PHP would cause errors in handling IPv6 packets on a penultimate node which lacks IPv6 capabilities. Because the IPv6 packet header structure is not the same as specified by IPv4, any attempt to modify the portion of the IPv6 packet erroneously believed to be the IPv4 TTL field will corrupt the packet. Furthermore, the egress node will be configured to receive MPLS IPv4 packets rather than IPv6 packets on any interface connected to network 204 and IPv6 packets will be dropped.

According to one embodiment of the present invention, the inclusion of the second level label avoids these undesirable consequences. If penultimate node 206A performs PHP, the second level label remains. Penultimate node 206A employs MPLS rather than IPv4 packet handling procedures and the MPLS-encapsulated IPv6 packet is handled correctly prior to forwarding to egress node 210A even though penultimate node 206A lacks IPv6 packet processing capabilities. Between penultimate node 206A and egress node 210A, the presence of the second level label assures that the MPLS header remains.

According to one embodiment of the present invention, the value used as the second level label has been distributed by the egress node through a label distribution protocol and associated with an IPv6 FEC. Thus, according to one embodiment of the present invention, the inclusion of the second level label can effectively serve as a protocol ID to identify the packet to egress node 210A as being an IPv6 packet. This is particularly useful when the same LSP is used simultaneously for transport of IPv4 packets and IPv6 packets.

The process by which ingress node 208A populates its IPv6 forwarding table with label stack information including the second level label is discussed in detail in the co-filed application entitled "IPv6 over MPLS IPv4 Core". The second level label is included in an MP-BGP inter-domain routing advertisement by egress node 210A. Egress node 210A may associate the same second level label with all the destination networks that it advertises. Alternatively, there may be one second level label per set of advertised destination networks. A further alternative is to associate a unique second level label with each advertised destination network or each set of advertised destination networks going to the same next hop. With the latter alternative, the inclusion of the second level label effectively allows the egress node to perform its forwarding decision through a label lookup only without the need for doing an IPv6 destination lookup.

Figure 4:
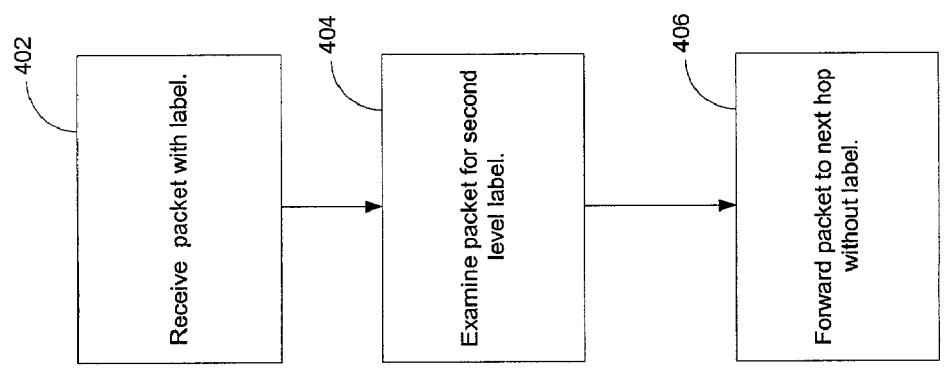
FIG. 4 is a flow chart describing steps of forwarding an IPv6 packet received from an MPLS IPv4 network into an IPv6 network according to one embodiment of the present invention.

As mentioned above, the use of the second level label also brings beneficial effects after the IPv6 packet is received at egress node 210A. FIG. 4 is a flowchart describing steps of handling the received packet according to one embodiment of the present invention at egress node 210A. At step 402, egress node 210A receives the MPLS-encapsulated IPv6 packet. At step 404, egress node 210A examines the received packet and sees that it contains a second level label that has been advertised by egress node 210 and that is associated with an IPv6 FEC. Depending on the information provided during label distribution by node 210A, a lookup on this label value may be sufficient to carry out the complete forwarding decision (i.e. lookup returns next hop, encapsulating information, etc.) or may otherwise indicate that another lookup is necessary to forward the packet and that this additional lookup is an IPv6 lookup (i.e., a longest match look up of the destination IPv6 address of the IPv6 packet into the IPv6 forwarding table). At step 406, as a result of this lookup, the egress node 210A forwards the IPv6 packet to a next hop into the IPv6 network. The packet is forwarded to the selected next hop without the second level label or MPLS header.

The second level label may also be used to implement load balancing inside IPv4 MPLS network 204. Certain IPv4 MPLS node implementations perform load balancing of traffic by splitting traffic arriving with a given top incoming label value over multiple outgoing label values. A number of these implementations pick from one of multiple outgoing label values corresponding to the incoming label value based on encapsulated IPv4 header information (e.g. source and destination IPv4 addresses). For non-IPv4 traffic, the selection may be based on an encapsulated bottom label if the label stack has more than one level The inclusion of a second level label will allow such IPv4 MPLS nodes to effectively achieve load balancing of IPv6 traffic without native IPv6 processing capabilities.

Thus it will be seen that, in one embodiment, the present invention avoids the need for special reconfiguration of penultimate nodes to suppress penultimate hop processing. Also, the second level label facilitates recognition of tunneled IPv6 packets at the egress node. The recognition is done on a per-packet basis and can be done without IP header inspection. In certain implementations, the forwarding decision made by the egress may be based on the second level label rather than the IPv6 destination address. The second level label may also facilitate load balancing of IPv6 traffic within the IPv4 MPLS network.

It is understood that the examples and embodiments that are described herein are for illustrative purposes only and various modifications are changes in light thereof will be suggested to persons skilled in the art and are to be included within the spirit and purview of this application and scope of the appended claims and their full scope of equivalents.

The invention claimed is:

1. A method for operating a network node to forward a packet employing a first addressing scheme through a label switched network employing a second addressing scheme, said method comprising:
   receiving said first addressing scheme packet;
   extracting destination address information according to said first addressing scheme from said first addressing scheme packet;
   based on said destination address information, selecting a label stack including a first level label identifying a label switched path and a second level label distributed by an egress node of said label switched network, said second level label identifying said packet as configured for said first addressing scheme; and
   forwarding said first addressing scheme packet along with said label stack into said label switched path through said label switched network terminated by said egress node, without encapsulation within a packet incorporating address information specified by said second addressing scheme;
   wherein said first and second addressing schemes comprise different versions of an IP addressing scheme.

2. The method of claim 1 wherein said first addressing scheme comprises an IPv6 addressing scheme and said second addressing scheme comprises an IPv4 addressing scheme.

3. The method of claim 2 wherein said label switched network comprises an MPLS IPv4 network.

4. The method of claim 1 further comprising:
   receiving an interdomain routing advertisement including said second level label.

5. A method for operating an egress node of a label switched network employing a first network layer protocol to interface with a network employing a second network layer protocol, said method comprising:
   receiving a packet from said label switched network, said packet comprising a second level label identifying said packet as configured for transport according to said second network layer protocol;
   removing a first level label;
   examining said packet to detect said second level label advertised by said egress node; and
   processing said packet in accordance with at least one of said second network layer protocol and said second level label;
   wherein said first and second network layer protocols comprise different versions of IP.

6. The method of claim 5 wherein said label switched network comprises an MPLS network.

7. The method of claim 5 wherein said first network layer protocol comprises IPv4 and said second network layer protocol comprises IPv6.

8. The method of claim 5 wherein processing comprises:
   forwarding said packet into said network employing said second network layer protocol without said second level label.

9. The method of claim 8 wherein forwarding comprises:
   selecting a next hop node based on said second level label.

10. The method of claim 8 wherein forwarding comprises:
    examining said second level label to identify said second network layer protocol;
    examining said packet to determine a destination address according to said second network layer protocol of said packet; and
    selecting a next hop node based on said destination address.

11. The method of claim 5 further comprising:
    prior to receiving said packet, distributing information indicating reachability of a destination network through said egress node, said information including said second level label to be used in tunneling packets formatted according to said second network layer protocol through said label switched network to said egress node.

12. A computer program product for operating a network node to forward a packet employing a first addressing scheme through a label switched network employing a second addressing scheme, said computer program product comprising:
    code that extracts destination address information according to said first addressing scheme from a received first addressing scheme packet;
    code that, based on said destination address information, selects a label stack including a first level label identifying a label switched path and a second level label distributed by an egress node of said label switched network, said second level label identifying said packet as configured for said first addressing scheme;
    code that forwards said first addressing scheme packet along with said label stack into said label switched path through said label switched network terminated by said egress node, without encapsulation within a packet incorporating address information specified by said second addressing scheme; and
    a computer-readable storage medium that stores the codes;
    wherein said first and second addressing schemes comprise different versions of an IP addressing scheme.

13. The computer program product of claim 12 wherein said first addressing scheme comprises an IPv6 addressing scheme and said second addressing scheme comprises an IPv4 addressing scheme.

14. The computer program product of claim 13 wherein said label switched network comprises an MPLS IPv4 network.

15. The computer program product of claim 12 wherein said first addressing scheme comprises an IPv4 addressing scheme and said second addressing scheme comprises an IPv6 addressing scheme.

16. The computer program product of claim 15 wherein said label switched network comprises an MPLS IPv6 network.

17. The computer program product of claim 12 further comprising:
    code that extracts said second level label from said received interdomain routing advertisement.

18. A computer program product for operating an egress node of a label switched network employing a first network layer protocol to interface with a network employing a second network layer protocol, said method comprising:
    code that examines a packet received from said label switched network to detect a second level label advertised by said egress node; said second level label identifying said packet as configured for transport according to said second network layer protocol;

code that removes a first level label;

code that processes said packet in accordance with at least one of said second level label and said second network layer protocol; and a computer-readable storage medium that stores the codes;

wherein said first and second network layer protocols comprise different versions of IP.

19. The computer program product of claim 18 wherein said label switched network comprises an MPLS network.

20. The computer program product of claim 18 wherein said first network layer protocol comprises IPv4 and said second network layer protocol comprises IPv6.

21. The computer program product of claim 18 wherein said first network layer protocol comprises IPv6 and said second network layer protocol comprises IPv4.

22. The computer program product of claim 18 wherein said code that processes comprises:

code that forwards said packet into said network employing said second network layer protocol determined from said second level label.

23. The computer program product of claim 22 wherein said code that forwards comprises:

code that selects a next hop node based on said second level label.

24. The computer program product of claim 22 wherein said code that forwards comprises:

code that examines said second level label to identify said network layer protocol;

code that examines said packet to determine a destination address of said packet; and code that selects a next hop node based on said destination address.

25. The computer program product of claim 18 further comprising:

code that prior to receiving said packet, distributes information indicating reachability of a destination network through said egress node, said information including said second level label to be used in encapsulating packets formatted according to said second network layer protocol through said label switched network to said egress node.

26. A network device comprising:

a processor; and a memory storing instructions to be executed by said processor, said instructions comprising:

code that extracts destination address information according to said first addressing scheme from a received first addressing scheme packet;

code that, based on said destination address information, selects a label stack including a first level label identifying a label switched path and a second level label distributed by an egress node of said label switched network, said second level label identifying said packet as configured for said first addressing scheme; and code that forwards said first addressing scheme packet along with said label stack into said label switched path through said label switched network terminated by said egress node, without encapsulation within a packet incorporating address information specified by said second addressing scheme;

wherein said first and second addressing schemes comprise different versions of an IP addressing scheme.

27. The network device of claim 26 wherein said first addressing scheme comprises an IPv6 addressing scheme and said second addressing scheme comprises an IPv4 addressing scheme.

28. The network device of claim 27 wherein said label switched network comprises an MPLS IPv4 network.

29. The network device of claim 26 wherein said first addressing scheme comprises an IPv4 addressing scheme and said second addressing scheme comprises an IPv6 addressing scheme.

30. The network device of claim 29 wherein said label switched network comprises an MPLS IPv6 network.

31. A network device comprising:

a processor; and a memory storing instructions to be executed by said processor, said instructions comprising:

code that examines a packet received from said label switched network to detect a second level label advertised by said network device, said second level label identifying said packet as configured for transport according to said second network layer protocol; and code that removes a first level label;

code that processes said packet in accordance with said at least one of said second level label and said second network layer protocol;

wherein said first and second network layer protocols comprise different versions of IP.

32. The network device of claim 31 wherein said label switched network comprises an MPLS network.

33. The network device of claim 31 wherein said first network layer protocol comprises IPv4 and said second network layer protocol comprises IPv6.

34. The network device of claim 31 wherein said first network layer protocol comprises IPv6 and said second network layer protocol comprises IPv4.

35. Apparatus for operating a network node to forward a packet employing a first addressing scheme through a label switched network employing a second addressing scheme, said apparatus comprising:

means for receiving said first addressing scheme packet;

means for extracting destination address information according to said first addressing scheme from said first addressing scheme packet;

means for based on said destination address information, selecting a label stack including a first level label identifying a label switched path and a second level label distributed by an egress node of said label switched network, said second level label identifying said packet as configured for said first addressing scheme; and means for forwarding said first addressing scheme packet along with said label stack into a label switched path through said label switched network terminated by said egress node, without encapsulation within a packet incorporating address information specified by said second addressing scheme;

wherein said first and second addressing schemes comprise different versions of an IP addressing scheme.

36. Apparatus for operating an egress node of a label switched network employing a first network layer protocol to interface with a network employing a second network layer protocol, said apparatus comprising:

means for receiving a packet from said label switched network, said packet comprising a second level label identifying said packet as configured for transport according to said second network layer protocol;

means for removing a first level label;

means for examining said packet to detect said second level label advertised by said egress node; and means for processing said packet in accordance with at least one of said second level label and said second network layer protocol;

wherein said first and second network layer protocols comprise different versions of an IP.

37. The method of claim 5 wherein said second level label is associated with an IPv6 forwarding equivalence class.

38. The method of claim 5 wherein said second level label is used in load balancing within said label switched network.

* * * * *